(12) United States Patent
Whitener (10) Patent No.: US 8,662,540 B2
(45) Date of Patent: Mar. 4, 2014

(54) QUICK TUBE CONNECTOR

(76) Inventor: Philip C. Whitener, Silverdale, WA (US)

(*) Notice: Subject to any disclaimer, the term of this patent is extended or adjusted under 35 U.S.C. 154(b) by 0 days.

(21) Appl. No.: 13/287,318

(22) Filed: Nov. 2, 2011

(65) Prior Publication Data

US 2013/0106100 A1    May 2, 2013

(51) Int. Cl.
  *F16L 23/036* (2006.01)
  *F16L 19/065* (2006.01)
  *F16L 21/00* (2006.01)

(52) U.S. Cl.
  USPC .............. 285/87; 285/84; 285/88; 285/320; 285/369; 285/372; 285/413; 285/414; 285/418

(58) Field of Classification Search
  USPC .......... 285/274, 372, 405, 413, 414, 418, 81, 285/82, 84, 87, 88, 91, 320, 369, 417
  See application file for complete search history.

(56) References Cited

U.S. PATENT DOCUMENTS

| | | | |
|---|---|---|---|
| 174,572 A * | 3/1876 | Rankin | 285/356 |
| 2,518,026 A | 7/1946 | Krapp | |
| 3,720,428 A * | 3/1973 | Zastawny | 285/368 |
| 3,976,313 A | 8/1976 | Lauffenburger et al. | |
| 4,295,670 A | 10/1981 | Goodall et al. | |
| 4,310,185 A | 1/1982 | Bartholomew | |
| 4,606,565 A * | 8/1986 | Royston | 285/337 |
| 4,836,581 A * | 6/1989 | Guilloteau | 285/31 |
| 4,923,228 A | 5/1990 | Laipply | |
| 5,257,833 A | 11/1993 | McNaughton et al. | |
| 5,295,717 A | 3/1994 | Watson | |
| 5,350,203 A | 9/1994 | McNaughton et al. | |
| 5,354,102 A | 10/1994 | Carman | |
| 5,476,292 A * | 12/1995 | Harper | 285/337 |
| 5,538,297 A | 7/1996 | McNaughton et al. | |
| 6,168,210 B1 * | 1/2001 | Bird | 285/337 |
| 6,419,281 B1 | 7/2002 | Salomon-Bahls et al. | |
| 6,423,053 B1 | 7/2002 | Lee | |
| 6,467,817 B1 | 10/2002 | Rhyman | |
| 6,585,695 B1 | 7/2003 | Adair et al. | |
| 6,676,171 B2 | 1/2004 | Bucher et al. | |
| 6,767,034 B2 | 7/2004 | Le Clinche | |
| 6,964,434 B2 | 11/2005 | Beck et al. | |
| 6,983,958 B2 | 1/2006 | Rautureau et al. | |
| 6,997,486 B2 | 2/2006 | Milhas | |
| 7,198,611 B2 | 4/2007 | Connell et al. | |

(Continued)

FOREIGN PATENT DOCUMENTS

| EP | 0742402 A1 | 11/1999 |
|---|---|---|
| EP | 1233192 A2 | 8/2002 |

(Continued)

*Primary Examiner* — James Hewitt (57) ABSTRACT

Systems for coupling tubes, pipes, conduits, ducts, and the like. In at least some embodiments, a coupling assembly includes a sleeve, a retaining member having an angled end surface, and a locking member. A tube is positioned through the locking member, the retaining member, and into the sleeve. In a first position, a first portion of the locking member contacts an angled end surface of the retaining member, and a second portion of the locking member is spaced apart from the angled end surface. The locking member is then tilted into a second position wherein the second portion is relatively closer to the angled end surface to securely engage the locking member with the tube, and the locking member is then secured in the tilted (or second) position relative to the sleeve, thereby securing the tube within the sleeve.

4 Claims, 7 Drawing Sheets

(56) References Cited

U.S. PATENT DOCUMENTS

| | | |
|---|---|---|
| 7,201,403 B2 | 4/2007 | Takayanagi et al. |
| 7,232,419 B2 | 6/2007 | Castellanos |
| 7,331,821 B2 | 2/2008 | Feldman |
| 7,338,092 B1 | 3/2008 | Cicconi, III |
| 7,370,889 B2 | 5/2008 | Maunder et al. |
| 7,387,318 B2 | 6/2008 | Yoshida |
| 7,390,029 B2 | 6/2008 | Matsubara |
| 7,393,019 B2 | 7/2008 | Taga et al. |
| 7,438,328 B2 | 10/2008 | Mori et al. |
| 7,530,606 B1 | 5/2009 | Yang |
| 7,597,362 B2 | 10/2009 | Hartmann |
| 7,780,201 B2 | 8/2010 | Luzbetak et al. |
| 2005/0057042 A1 | 3/2005 | Wicks |
| 2005/0189765 A1 | 9/2005 | Maunder et al. |

FOREIGN PATENT DOCUMENTS

| | | | |
|---|---|---|---|
| EP | 1561987 A1 | 8/2005 | |
| EP | 1975496 A2 | 10/2008 | |
| JP | 11-260481 | 9/1999 | |
| JP | 2008-232438 | 10/2008 | |
| WO | WO 9119927 A1 * | 12/1991 | ............ F16L 37/00 |

* cited by examiner

QUICK TUBE CONNECTOR

FIELD OF THE INVENTION

The present disclosure is directed to apparatus and methods for coupling tubes, pipes, conduits, ducts or other similar devices.

BACKGROUND OF THE INVENTION

A wide-range of applications involve coupling tubes or other similar devices (e.g. pipes, conduits, ducts, etc.) to facilitate transport of various fluidic and gaseous media, including household plumbing and heating systems, automotive systems, aerospace systems, industrial systems, and others. Many prior art mechanisms exist for coupling such components together, including clamps, connectors, adhesives, and the like. Although desirable results have been achieved using such prior art systems, there is room for improvement, particularly in circumstances wherein access to the components being connected is restricted.

SUMMARY

Systems and methods for coupling tubes, pipes, conduits, ducts, and the like are disclosed. Embodiments of systems and methods in accordance with the teachings of the present disclosure may advantageously enable relatively simple and quick coupling mechanisms for tubes that are relatively easy to implement, and that do not require tools, glues, heating, or other time-consuming operations. Such embodiments may also provide advantages over conventional coupling assemblies in certain space-restricted environments and applications.

In at least some embodiments, a coupling assembly in accordance with the teachings of the present disclosure includes a sleeve and a locking member. A tube is positioned through the locking member and into the sleeve. The locking member is then tilted into secure engagement with the tube, and the locking member is secured in the tilted position relative to the sleeve, thereby securing the tube within the sleeve.

In a further embodiment, a coupling assembly configured to couple a first tube and a second tube includes a sleeve having first and second ends, each end of the sleeve being configured to receive an end portion of a corresponding one of the first and second tubes. The assembly may further include first and second retainers, each retainer being positioned adjacent a corresponding one of the first and second ends of the sleeve, each retainer having an aperture disposed therethrough and configured to receive a corresponding one of the end portions of the first and second tubes, each retainer having an angled end surface at an end thereof opposite from the sleeve. The assembly may further include first and second locking members, each locking member being positioned adjacent a corresponding one of the angled end surfaces of the retainers, each locking member having an aperture disposed therethrough and configured to receive a corresponding one of the end portions of the first and second tubes. The assembly may further include a latch configured to extend between the first and second locking members and configured such that, when the latch is engaged between the first and second locking members, each locking member is tilted into secure engagement with a corresponding one of the first and second tubes, securing the end portions of the first and second tubes within the first and second ends of the sleeve.

This summary is not intended to be limiting, but rather, is merely intended to introduce a few possible embodiments of coupling assemblies in accordance with the teachings of the present disclosure. Additional embodiments and aspects in accordance with the teachings of the present disclosure are described more fully below.

BRIEF DESCRIPTION OF THE DRAWINGS

Embodiments of the present disclosure are described in detail below with reference to the following drawings.

DETAILED DESCRIPTION

The present disclosure is directed to systems and methods for coupling tubes or other similar devices (e.g. pipes, conduits, ducts, etc.). Many details of specific embodiments in accordance with the present disclosure are set forth in the following description and in FIGS. 1-13 to provide a thorough understanding of such embodiments. One skilled in the art, however, will understand that the present invention may have additional embodiments, and that alternate embodiments of the invention may be practiced without one or more of the details described in the following description.

Figure 1:
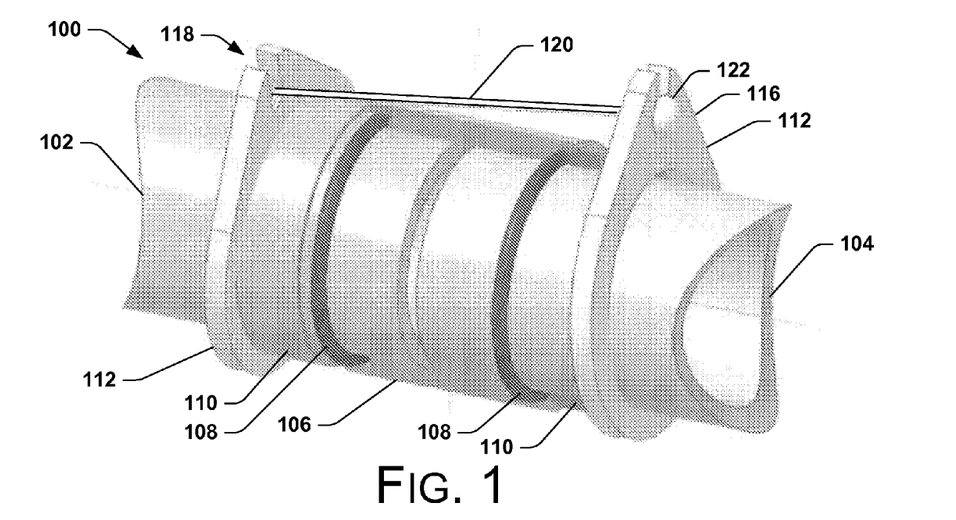
FIG. 1 is an isometric, partially-cutaway view of an embodiment of a tube coupling assembly in accordance with the teachings of the present disclosure.
Figure 2:
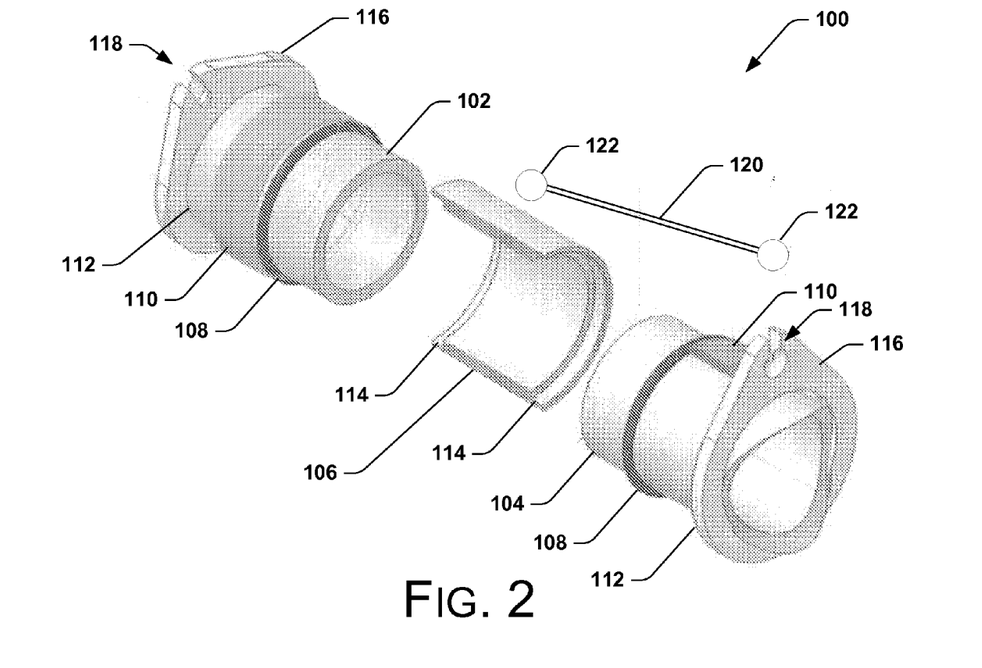
FIG. 2 is a partially-exploded isometric view of the tube coupling assembly of FIG. 1.

FIG. 1 is an isometric, partially-cutaway view of an embodiment of a tube coupling assembly 100 in accordance with the teachings of the present disclosure. The tube coupling assembly 100 couples a first tube 102 and a second tube 104 together. FIG. 2 is a partially-exploded, partially-cutaway isometric view of the tube coupling assembly 100 of FIG. 1.

In this embodiment (FIGS. 1 and 2), the tube coupling assembly 100 includes a tubular sleeve 106 (half shown in cutaway view) dimensioned to slideably receive corresponding end portions of the first and second tubes 102, 104. The tube coupling assembly 100 may further include a pair of O-rings 108, a pair of retainers 110 (one shown in full, one shown in cutaway), and a pair of locking members 112. One of each of the O-rings 108, the retainers 110, and the locking members 112 is positioned on a corresponding one of the first and second tubes 102, 104. In at least some embodiments, each end of the sleeve 106 may include a seat 114 (visible in FIG. 2) configured to engage a corresponding one of the O-rings 108 when positioned on the first or second tube 102, 104. In at least some embodiments, the O-rings 108 may be standard, commercial-off-the-shelf components (e.g. military (MIL) specification, household grade, etc.). In further embodiments, the O-rings 108 may be eliminated if a seal is not required.

As further shown in FIGS. 1 and 2, each of the locking members 112 includes an outwardly-extending flange portion 116 having a retaining aperture 118 disposed therein. An elongated latch 120 having enlarged end portions 122 extends between the locking members 112.

Figure 3:
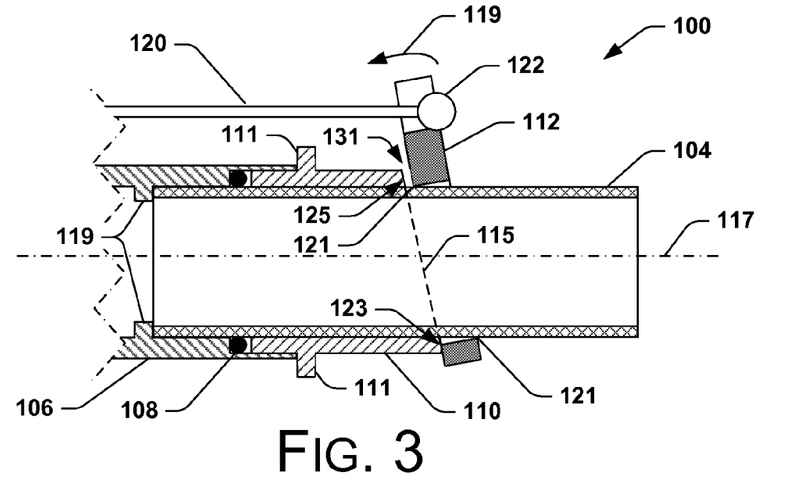
FIG. 3 is an enlarged partial cross-sectional view of a portion of the tube coupling assembly of FIG. 1.

FIG. 3 is an enlarged, partial cross-sectional view of a portion of the tube coupling assembly 100 of FIG. 1. It will be appreciated that the components shown in FIG. 3 are not drawn to scale, but rather, certain dimensions have been exaggerated to improve clarity and understanding of various aspects of the tube coupling assembly 100 described below. As shown in FIG. 3, in at least some embodiments, the retainer 110 may include one or more stops 111 that project outwardly from the retainer 110 and that limit the extent that the sleeve 106 slides onto the retainer 110. It will be appreciated that the extent (or overlap) to which the sleeve 106 is engaged onto the retainer 110 may be desirably controlled to provide a standard seat for the "O" ring and a desired mechanical rigidity of the tube coupling assembly 100. Alternately, or in addition to the one or more stops 111, the sleeve 106 may include one or more inner stops 119 that project inwardly from the sleeve 106 to limit the extent that the second (and/or first) tube 104 slides into the sleeve 106. It will be further appreciated that the tube coupling assembly 100 shown in FIG. 3 is not necessarily drawn to scale, and that in alternate embodiments, the dimensions of the various components may be adjusted to provide smaller tolerances between components to provide improved sealing and overall performance of the assembly.

In the embodiment shown in FIG. 3, an end surface 115 of the retainer 110 that is positioned proximate the locking member 112 is angled (or "scarfed") such that a lower portion 123 engages the locking member 121 and an upper portion 125 is sufficiently spaced apart from the locking member 112 to provide a clearance 131 which enables the locking member 112 to tilt (or pivot, or tip, etc.) as indicated by arrow 119. In turn, the tilting of the locking member 112 causes the locking member 112 to become firmly engaged with (or "bite") the corresponding tube (e.g. second tube 104) upon which the locking member 112 is positioned at or along engagement locations 121, preventing the second tube 104 from being withdrawn from the sleeve 106. In this way, the locking member 112 engages or captures the second tube 104 and, in cooperation with the latch 120 which holds the locking member 112 in the tilted position, secures the second tube 104 to the coupling assembly 100. It will be appreciated that improved engagement of the locking member 112 with the corresponding tube (e.g. the second tube 104 or other suitable workpiece on which the locking member 112 is engaged) may be achieved by ensuring that the hardness of the locking member 112 is greater than the hardness of the corresponding tube (or workpiece), such as by proper materials selection, materials hardening processes, or other suitable techniques.

Figure 11:
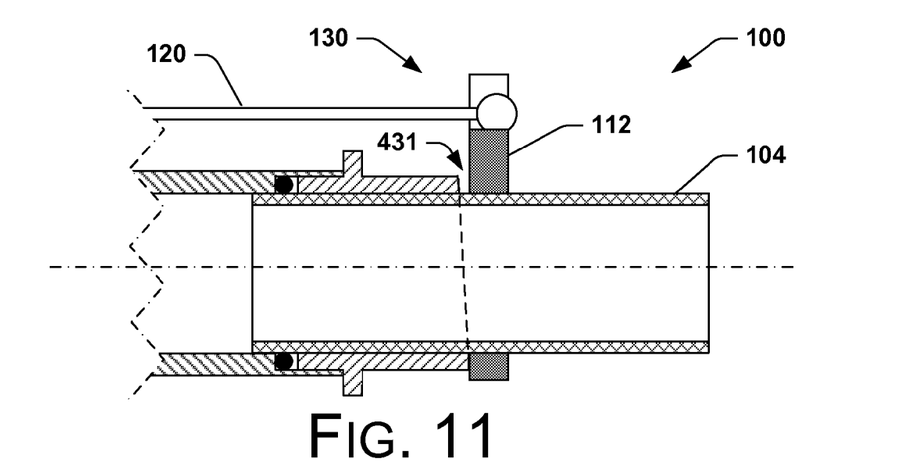
FIG. 11 is a side cross-sectional view depicting a locking member of FIG. 3 positioned in a first position in accordance with the teachings of the present disclosure.
Figure 12:
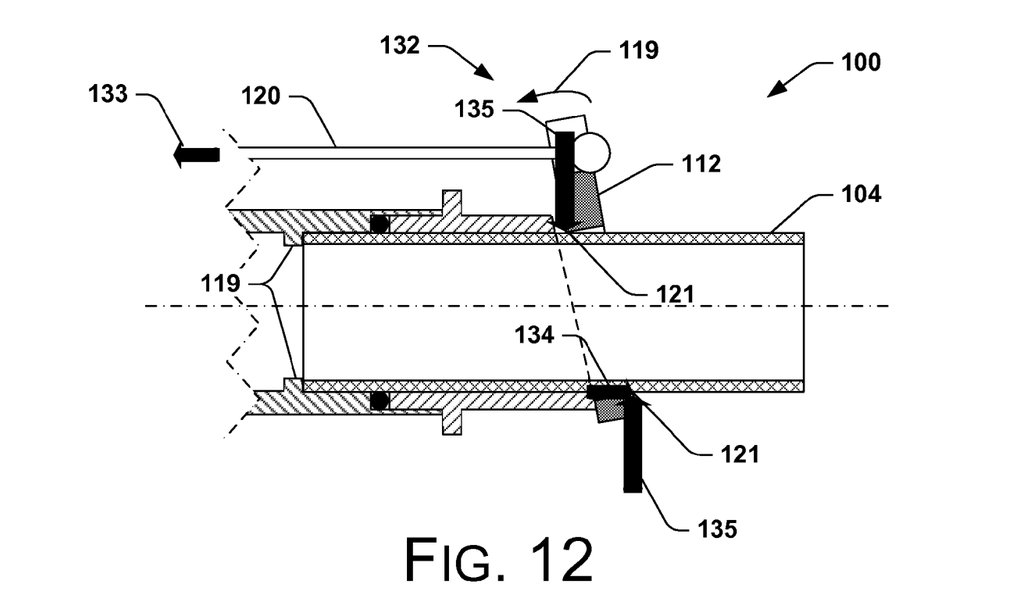
FIG. 12 is a side cross-sectional view depicting the locking member of FIG. 11 in a second position in accordance with the teachings of the present disclosure.

More specifically, FIG. 11 shows the locking member 112 positioned in a first position 130 on the second tube 104 in accordance with the teachings of the present disclosure. The latch 120 is engaged with the locking member 112 but is not yet drawn into engagement with the other locking member 112 (shown in FIGS. 1 & 2). As shown in FIG. 12, as a latching force 133 is applied via the latch 120, the locking member 112 is engaged by contact with 121 (force 134) and begins to tilt as depicted by the arrow 119, causing the locking member 112 to move into a second position 132 and exerting a pair of locking forces 135—onto the second tube 104 at locations 121 (Note: force vectors 133, 134, 135 not necessarily drawn to scale in FIG. 12). The locking forces 135 and axial engagement force(s) 134 exerted by the locking member 112 on the second tube 104 securely engage the second tube 104 in a desired position.

Figure 13:
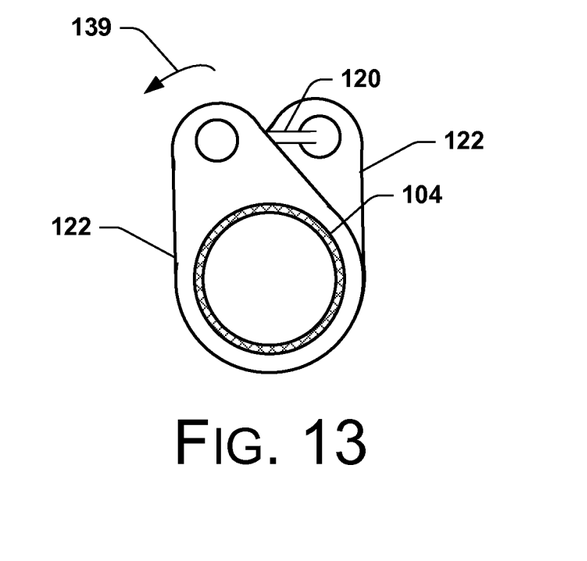
FIG. 13 is an end elevational view depicting the locking member of FIG. 12 in accordance with the teachings of the present disclosure.

In addition to the operations described above, the tube coupling assembly 100 may be further secured by "twisting" one or more of the locking members 122 in opposing directions to provide tension in the latch 120 and to remove any remaining slack from the assembly 100. For example, FIG. 13 is an end elevational view depicting the locking members 122 of FIG. 12 in accordance with the teachings of the present disclosure. By twisting the second locking member 122 about the longitudinal axis 117 as depicted by arrow 139, any remaining looseness in the assembly 100 may be reduced or eliminated, and a tension in the latch 120 may be provided in order to maintain the secure engagement of the locking members 122 with the tubes 102, 104.

The operation of the tube coupling assembly 100 will now be described with reference to FIG. 4, which shows a flow chart of a method 200 of coupling tubes in accordance with the teachings of the present disclosure. For simplicity, the method 200 may initially be described in terms of coupling first and second tubes 102, 104 (as shown in FIGS. 1-3), however, it will be appreciated that in alternate embodiments, other numbers of tubes may be coupled as described more fully below.

The method 200 may optionally include inspecting and/or cleaning the surfaces of the tubes where the O-rings will be positioned at 202. One of the locking members 112 is positioned (e.g. by sliding) onto each of the tubes being connected at 204. At 206, one of the retainers 110 is positioned (e.g. by sliding) onto each of the tubes being connected. More specifically, each retainer 110 may be positioned onto the tube adjacent the corresponding locking member 112, and is located between the locking member 112 and the end of the tube that is being connected to the other tube. As further shown in FIG. 4, one of the O-rings 108 is positioned (e.g. by sliding) onto each of the tubes being connected at 208. More specifically, each O-ring 108 may be positioned onto the tube adjacent the corresponding retainer 110, and is located between the retainer 110 and the end of the tube that is being connected to the other tube.

The method 200 further includes inserting an end portion of each of the first and second tubes 102, 104 being connected into the sleeve 106 at 210. As shown in the partially-cutaway views of FIGS. 1 and 3, the end portions of the first and second tubes 102, 104 may preferably be inserted into the sleeve 106 so that the O-rings 108 are also contained within the sleeve 106. In some embodiments, the O-rings 108 will be inserted into the sleeve 106 and will be seated against the seats 114 formed in the sleeve 106. Furthermore, in at least some embodiments, a portion of each of the retainers 110 may also be inserted into the sleeve 106.

Figure 4:
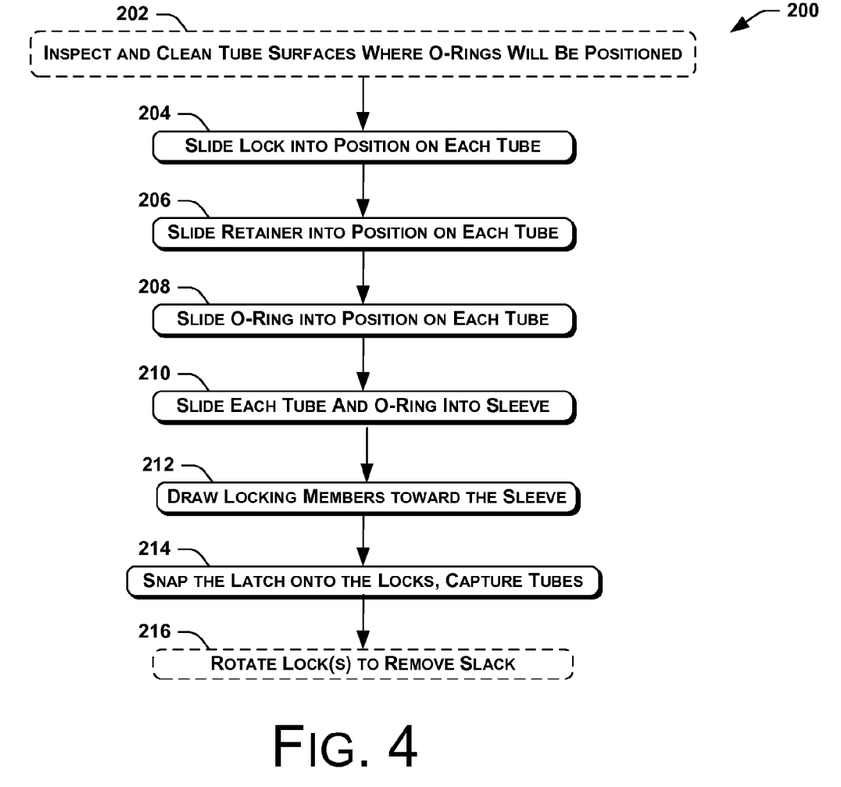
FIG. 4 is a flow chart of a method of coupling tubes in accordance with the teachings of the present disclosure.

With continued reference to FIG. 4, the method 200 further includes drawing (pushing or pulling) the locking members 112 together toward the sleeve 106 at 212. In at least some embodiments, as the locking members 112 are drawn (pushed or pulled) together at 212, the locking members 112 engage and urge the retainers 110 toward the sleeve 106, which in turn engage and urge the O-rings 108 toward the sleeve 106. In a preferred embodiment, each O-ring 108 may be formed of a suitably flexible material and may be captured between the corresponding retainer 110 and the sleeve 106 (e.g. the seat 114) to provide a sealed joint between the sleeve 106 and each of the first and second tubes 102, 104.

At 214, the latch 120 is snapped into each of the retaining apertures 118 of the locking members 112. As the latch 120 is engaged with the locking members 112, the locking members 112 are tilted, causing each locking member 112 to become firmly engaged with the corresponding tube upon which the locking member 112 is positioned as described above with respect to FIG. 3. Thus, the locking members 112 become securely engaged with the first and second tubes 102, 104 at or along engagement locations 121 (FIG. 3), preventing the tubes 102, 104 from being withdrawn from the coupling assembly 100. In addition, the method 200 may optionally include rotating one or more of the locking members 112 about the longitudinal axis 117 (FIG. 3) to remove any remaining slack at 216, thereby ensuring that the latch 120 extends tightly between the locking members 112.

It will be appreciated that the method 200 shown in FIG. 4 is just one possible embodiment, and that the invention is not limited to the particular embodiment described above and shown in FIG. 4. For example, in alternate embodiments, the order of the actions described above may be varied without departing from the spirit or scope of the invention. More specifically, in other exemplary embodiments, the ends of the first and second tubes 102, 104 may be inserted into the sleeve 106, and then the O-rings 108, retainers 110, and locking members 112 may be successively applied by sliding these components onto a distal end of the first and second tubes 102, 104. In further embodiments, two or more of the components may be combined to form a single component (e.g. the retainer 110 and locking member 112, the O-ring 108 and the retainer 110, the sleeve 106 and the O-ring 108, the O-ring 108, the retainer 110, and the locking member 112, etc.). In still further embodiments, one or more of the components may be eliminated (e.g. the O-ring 108, the retainer 110, etc.). Additional methods in accordance with the teachings of the present disclosure may be conceived, and will become apparent upon review of the disclosure of additional embodiments of tube coupling assemblies described below.

Embodiments of apparatus and methods in accordance with the teachings of the present disclosure may provide considerable advantages over the prior art. For example, embodiments in accordance with the present disclosure may allow tubes to be coupled quickly and easily using simple components, and without the need for tools. Furthermore, embodiments in accordance with the present disclosure may provide considerable advantages in space-restricted applications. It will also be appreciated that coupling assemblies in accordance with the present disclosure may also be used to couple other cylindrical objects, including such non-hollow objects as rods, bars, or any other suitable cylindrical objects.

Figure 5:
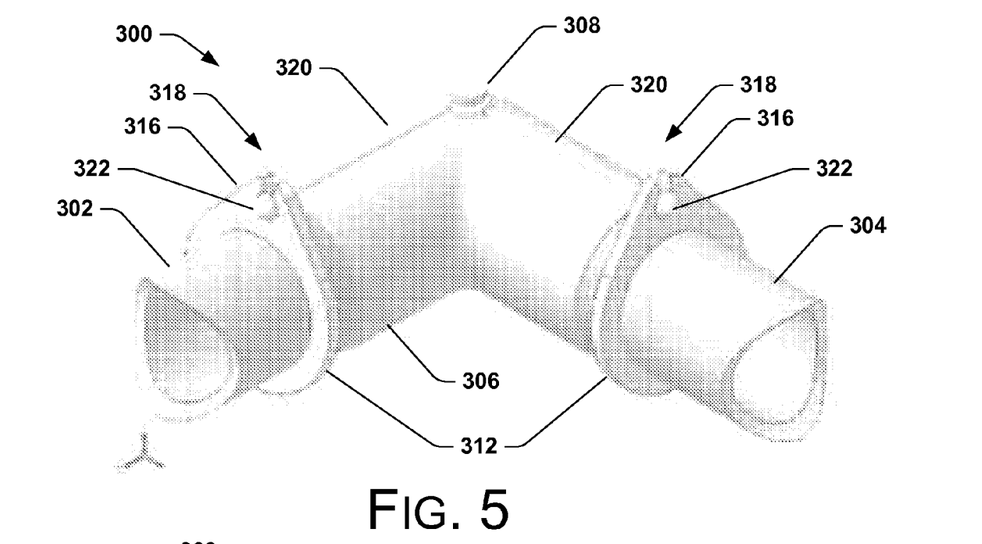
FIG. 5 is an isometric view of an embodiment of an angled coupling assembly in accordance with the teachings of the present disclosure.

Additional exemplary embodiments of coupling assemblies in accordance with the teachings of the present disclosure will now be described. For example, FIG. 5 is an isometric view of an embodiment of an angled (or elbow) coupling assembly 300 that couples a first tube 302 and a second tube 304 together in an angled (or elbow) fashion. More specifically, the elbow coupling assembly 300 includes an angled sleeve 306 dimensioned to slideably receive corresponding end portions of the first and second tubes 302, 304. In the embodiment shown in FIG. 5, the angled sleeve 306 couples the first and second tubes 302, 304 in an approximately right angle, however, in alternate embodiments, sleeves having any other desired angular values (e.g. 45 degrees, 60 degrees, 120 degrees, 135 degrees, etc.) may be employed.

The elbow coupling assembly 300 shown in FIG. 5 includes a locking member 312 positioned on each of the first and second tubes 302, 304, and may also include O-rings 108 and/or retainers 110 as described above with respect to the embodiment(s) shown in FIGS. 1-3. The angled sleeve 306 includes a retaining post 308 that projects outwardly therefrom, and a latch 320 extends from the retaining post 308 to each of the locking members 312. As noted above, each of the locking members 312 includes an outwardly-extending flange portion 316 having a retaining slot (or aperture, notch, etc.) 318 that receives and retains an end portion 322 of the latch 320.

It will be appreciated that embodiments of apparatus and methods in accordance with the embodiment shown in FIG. 5 may provide the above-referenced advantages of ease of use, quick coupling, and elimination of tools, and may also provide additional advantages for those applications that require coupling of cylindrical objects at various angles.

Figure 6:
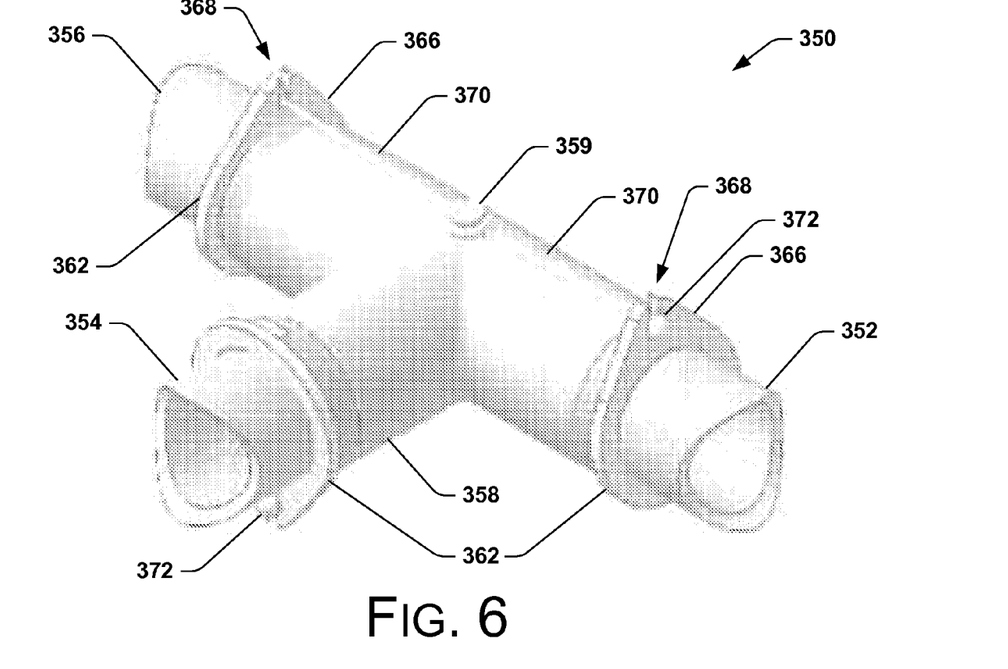
FIG. 6 is an isometric view of an embodiment of a T-shaped coupling assembly in accordance with the teachings of the present disclosure.

In further embodiments, coupling assemblies in accordance with the present disclosure may be used to couple more than two tubes or other cylindrical objects. For example, FIG. 6 shows an isometric view of an embodiment of a T-shaped coupling assembly 350 in accordance with the teachings of the present disclosure. In this embodiment, the T-shaped coupling assembly 350 couples first, second, and third tubes 352, 354, 356 in a T-shaped configuration. Although the embodiment shown in FIG. 6 displays a T-shaped configuration, in alternate embodiments, any other desired angular relationships between the three (or more) tubes (or other cylindrical objects) being coupled may be accomplished, including Y-shaped configurations and the like.

Referring again to FIG. 6, the T-shaped coupling assembly 350 includes a T-shaped sleeve 358 dimensioned to slideably receive corresponding end portions of the first, second, and third tubes 352, 354, 356. The T-shaped sleeve 358 includes a pair of retaining posts 359 (one visible) that project outwardly therefrom, and a locking member 362 is positioned on each of the first, second, and third tubes 352, 354, 356. The T-shaped coupling assembly 350 may also include O-rings 108 and/or retainers 110 as described above with respect to the embodiment(s) shown in FIGS. 1-3.

In the embodiment shown in FIG. 6, a latch 370 extends from the upper (visible) retaining post 359 to each of the locking members 362 positioned on the first and third tubes 352, 356. Similarly, another latch 370 (only the end portion 372 visible) extends from the lower retaining post 359 (not visible) to the locking member 362 positioned on the second tube 354.

Again, it will be appreciated that embodiments of apparatus and methods in accordance with the embodiment shown in FIG. 6 may provide the above-referenced advantages of ease of use, quick coupling, and elimination of tools, and may also provide additional advantages for those applications that require coupling of three (or more) cylindrical objects at various angles.

Figure 7:
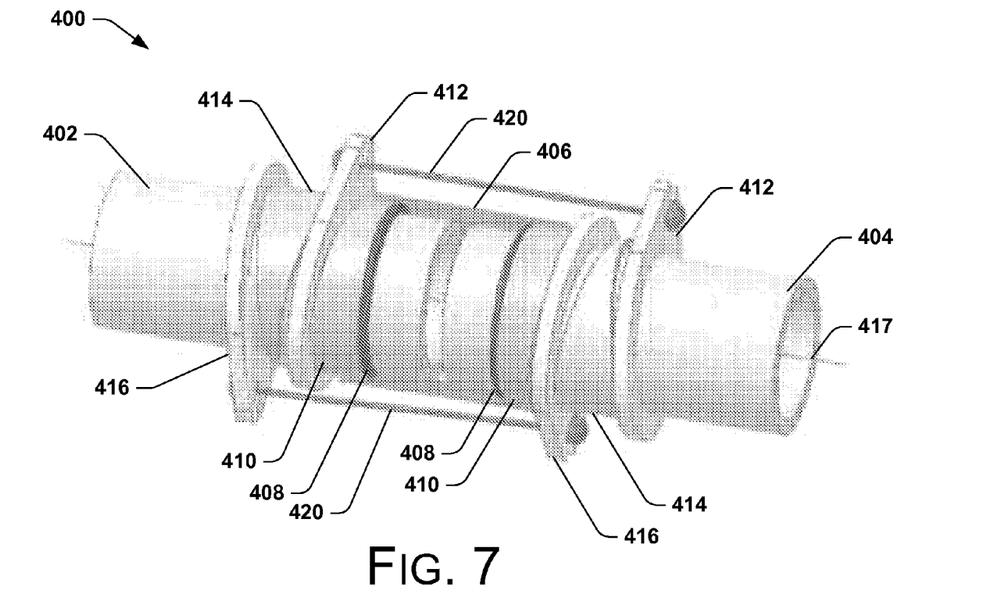
FIG. 7 is an isometric view of another embodiment of a tube coupling assembly in accordance with the teachings of the present disclosure.

FIG. 7 is an isometric view of another embodiment of a tube coupling assembly 400 in accordance with the teachings of the present disclosure. In this embodiment, the tube coupling assembly 400 couples a first tube 402 and a second tube 404 together using a dual-latching system. More specifically, the tube coupling assembly 400 includes a tubular sleeve 406 (half shown in cutaway view) dimensioned to slideably receive corresponding end portions of the first and second tubes 402, 404. The tube coupling assembly 400 further includes a pair of O-rings 408, a pair of retainers 410, a pair of first locking members 412, a pair of spacers 414, a pair of second locking members 416, and a pair of latches 420. The tube coupling assembly 400 having a dual-latching system as depicted in FIG. 7 may advantageously provide improved coupling performance for a variety of applications including, for example, high-pressure applications, applications that require greater locking strength (e.g. applications requiring increased margins of safety), applications that require improved eccentricity, or any other suitable applications.

In operation, one of each of the O-rings 408, the retainers 410, the first locking members 412, the spacers 414, and the second locking members 416 is positioned on a corresponding one of the first and second tubes 402, 404. As noted above, in at least some embodiments, the sleeve 406 may include seats (reference numeral 414 shown in FIG. 8) configured to engage a corresponding one of the O-rings 408 when positioned on the first or second tube 402, 404.

Figure 8:
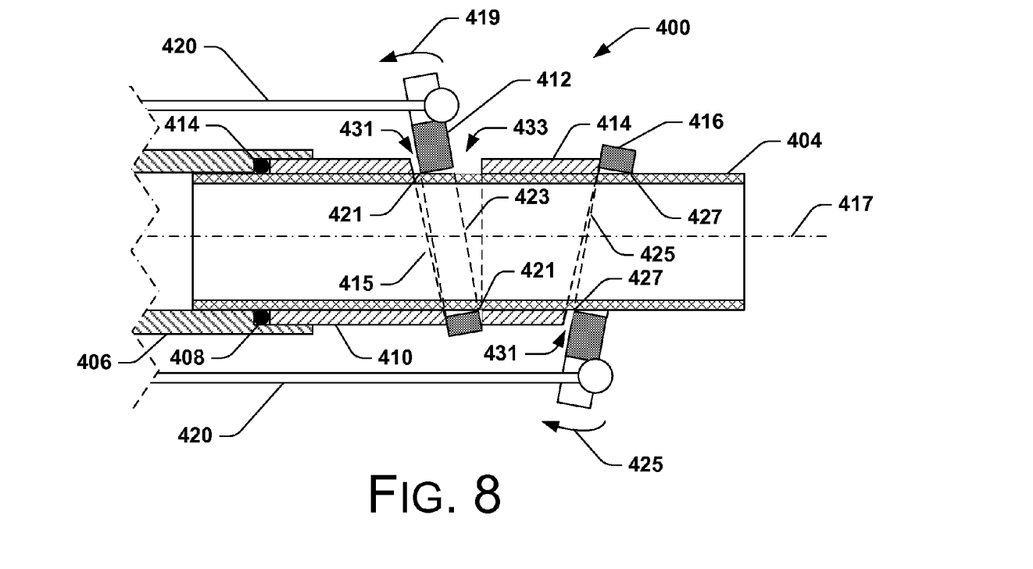
FIG. 8 is an enlarged partial cross-sectional view of a portion of the tube coupling assembly of FIG. 7.

FIG. 8 is an enlarged, partial cross-sectional view of a portion of the tube coupling assembly 400 of FIG. 7. Again, to improve clarity and understanding of various aspects of the tube coupling assembly 400, at least some of the components shown in FIG. 8 are not drawn to scale. As shown in FIG. 8, an end surface 415 of the retainer 410 that engages against the first locking member 412 (depicted by dashed line 415 for clarity) is angled (or canted) with respect to a longitudinal axis 417 of the retainer 410 to provide sufficient clearance(s) 431 to enable each locking member to be at least partially tilted from a first position spaced apart from the angled end surface 415 to a second position relatively closer to the angled end surface 415. As described above, the angled end surface 415 of the retainer 410 provides sufficient clearance(s) 431 to enable the locking member 412 to be at least partially tilted from a first position spaced apart from the corresponding end surface 415 to a second position relatively closer to the corresponding end surface 415, allowing the first locking member 412 to tilt (or pivot, or tip, etc.) as indicated by arrow 419. In turn, the tilting of the first locking member 412 causes the first locking member 412 to become firmly engaged with (or "bite") the second tube 404 upon which the first locking member 412 is positioned at or along engagement locations 421, preventing the second tube 404 from being withdrawn from the sleeve 406.

Similarly, as further shown in FIG. 8, a second end surface 425 of the spacer 414 that is proximate to the second locking member 416, (depicted by dashed line 425 for clarity) is also angled (or canted) with respect to the longitudinal axis 417. The second end surface 425 of the spacer 414 provides sufficient clearance to enable the second locking member 416 to pivot (or tip) as indicated by arrow 425. In this embodiment, a first end surface 423 of the spacer 414 is vertical to ensure contact with the locking member 412 at the bottom while providing clearance 433 at the top to reduce tolerance buildup. In turn, as with the first locking member 412, the tilting of the second locking member 416 causes the second locking member 416 to become firmly engaged with (or "bite") the second tube 404 upon which the second locking member 416 is positioned at or along engagement locations 427. Thus, the tube coupling assembly 400 of FIGS. 7 and 8 provides additional securing and engagement to prevent the tubes 402, 404 from withdrawing from the sleeve 406.

Figure 9:
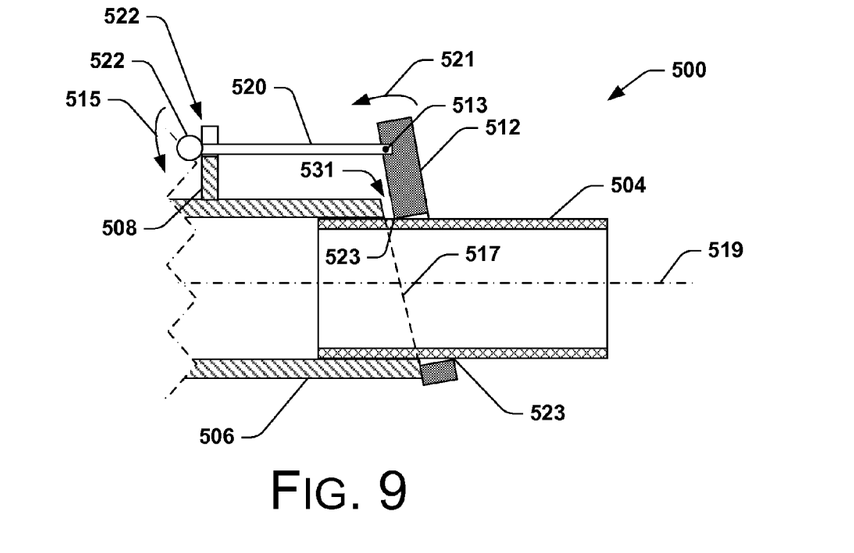
FIG. 9 is a side cross-sectional view of a portion of another embodiment of a tube coupling assembly in accordance with the teachings of the present disclosure.

As noted above, various alternate embodiments of tube coupling apparatus and methods may be readily conceived in accordance with the teachings of the present disclosure, and the invention should not be construed as being limited to the particular exemplary embodiments described above. As mentioned above, various components of the tube coupling assemblies described above may be variously combined or eliminated. For example, FIG. 9 is a side cross-sectional view of a portion of another embodiment of a tube coupling assembly 500 in accordance with the teachings of the present disclosure. In this embodiment, the tube coupling assembly 500 includes a sleeve 506 having a retaining post 508 that projects outwardly therefrom. A locking member 512 is engaged onto a tube 504, and a latch 520 is coupled to the locking member 512.

In some embodiments, the latch 520 may be pivotably coupled to the locking member 512, such as by a pin 513, enabling the latch 520 to be pivoted into engagement with the retaining post 508 (indicated by arrow 515). In alternate embodiments, the latch 520 may simply be fixedly coupled to the locking member 512. In some embodiments, the latch 520 may have an enlarged end 522 that engages into a retaining notch 509 formed in the retaining post 508 in substantially the same manner as the enlarged end portions 122 and retaining apertures 118 described above and shown in FIGS. 1-2. In alternate embodiments, any other suitable latching arrangement may be used, including a loop, catch, or other suitable latching mechanisms. In some embodiments (e.g. large embodiments), the latch might be a threaded rod with spherical washers and nuts.

As further shown in FIG. 9, an end surface 517 of the sleeve 506 that is proximate the locking member 512 (depicted by dashed line 517 for clarity) may be angled (or canted) with respect to a longitudinal axis 519 of the sleeve 506 (as shown in FIG. 9), or may be normal to the longitudinal axis 519 (as described above with respect to FIG. 3). The end surface 517 of the sleeve 506 provides sufficient clearance(s) 531 at the top to enable the locking member 512 to at least partially tilt (or pivot, or tip, etc.) as indicated by arrow 521. In turn, the tilting of the locking member 512 causes the locking member 512 to become firmly engaged with (or "bite") the tube 504 at or along engagement locations 523, preventing the tube 504 from being withdrawn from the sleeve 506. In this way, the locking member 512 engages or captures the tube 504 and, in cooperation with the latch 520 which holds the locking member 512 in the tilted position, secures the tube 504 to the sleeve 506.

It will be appreciated that embodiments of apparatus and methods in accordance with the embodiment shown in FIG. 9 may provide the above-referenced advantages of ease of use, quick coupling, and elimination of tools, and may also advantageously reduce the number of components needed to perform the desired coupling.

Figure 10:
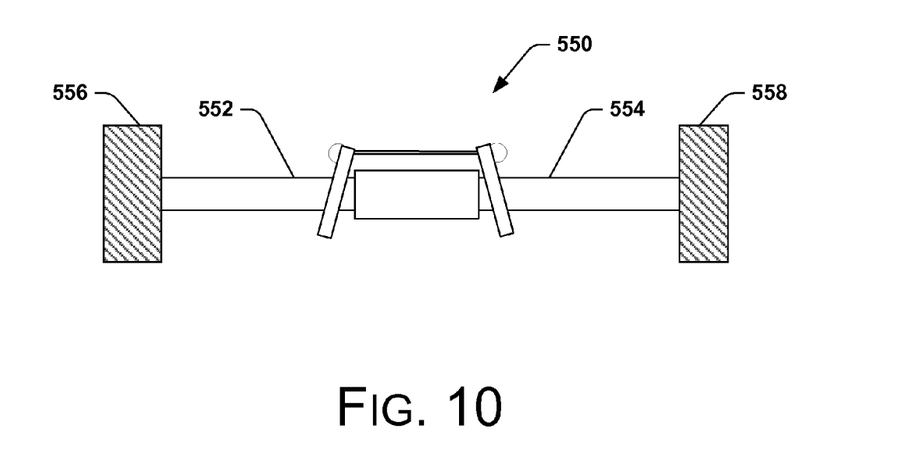
FIG. 10 is a side elevational view of another embodiment of a workpiece coupling assembly in accordance with the teachings of the present disclosure.

In additional embodiments, one or more of the above-described coupling assemblies may be used to couple two elongated workpieces that are substantially fixed along an axial direction. For example, FIG. 10 shows a coupling assembly 550 that couples a first elongated member 552 and a second elongated member 554. Each of the elongated members 552, 554 extends from corresponding support 556, 558 that substantially prevents movement of the elongated members 552, 554 along their axial directions. By deflecting the members 552, 554 a small amount laterally, the coupling sleeve may be slid over one tube and then engage both tubes when the lateral deflection has been removed. The coupling assembly 550 may be substantially similar (or identical) to one or more of the above-described coupling assemblies (e.g.

coupling assembly 100 show in FIGS. 1-3), and therefore, for the sake of brevity, will not be described in detail again. The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the present disclosure. Accordingly, the scope of the invention should be determined from the following claims.

What is claimed is:

1. A coupling assembly configured to couple a first tube and a second tube, comprising:

a sleeve having first and second ends, each end of the sleeve configured to receive an end portion of a corresponding one of the first and second tubes;

first and second retainers, each retainer being positioned adjacent a corresponding one of the first and second ends of the sleeve, each retainer having an aperture disposed therethrough and configured to receive a corresponding one of the end portions of the first and second tubes, each retainer having a scarfed end surface at an end thereof opposite from the sleeve;

first and second locking members, each locking member being positioned proximate a corresponding one of the scarfed end surfaces of the retainers such that a first portion of each locking member engages with a corresponding contact portion of the scarfed end surface, and a second portion of each locking member is spaced apart from the scarfed end surface with sufficient clearance to enable each locking member to be at least partially tilted from a first position wherein the second portion of each locking member is spaced apart from the scarfed end surface to a second position wherein the second portion of each locking member is relatively closer to the scarfed end surface, each locking member having an aperture disposed therethrough and configured to receive a corresponding one of the end portions of the first and second tubes, wherein the first and second locking members are configured to be firmly engageable with the first tube and second tube, respectively, as the first and second locking members are tilted from the first position to the second position; and a latch configured to extend between the first and second locking members and configured such that, when the latch is engaged between the first and second locking members, each locking member is tilted from the first position into the second position wherein, in the second position, the first and second locking members are configured to be securable with the end portions of the first and second tubes when the end portions are positioned within the first and second ends of the sleeve, respectively.

2. The coupling assembly of claim 1, wherein each locking member includes a retaining slot configured to receive and secure an end portion of the latch.

3. The coupling assembly of claim 1, further comprising first and second seals, each seal being disposed between the sleeve and a corresponding one of the first and second retainers.

4. The coupling assembly of claim 3, wherein the sleeve includes a seat disposed within each of the first and second ends, and wherein each seal is disposed adjacent the seat and a corresponding one of the first and second retainers.

* * * * *